United States Patent [19]

Waterworth

[11] Patent Number: 4,638,454
[45] Date of Patent: Jan. 20, 1987

[54] DIGITAL DATA STORAGE APPARATUS

[75] Inventor: John R. Waterworth, Cheadle, England

[73] Assignee: Ferranti plc, Cheshire, England

[21] Appl. No.: 446,458

[22] Filed: Dec. 3, 1982

[30] Foreign Application Priority Data

Dec. 4, 1981 [GB] United Kingdom ............... 8136683

[51] Int. Cl.$^4$ ............................................. G06F 12/00
[52] U.S. Cl. .................................................. 364/900
[58] Field of Search ... 364/200 MS File, 900 MS File

[56] References Cited

U.S. PATENT DOCUMENTS 3,241,125  3/1966  Tomasulo et al. ................. 364/900
3,742,458  6/1973  Inoue et al. ........................ 364/200
4,438,512  3/1984  Hartung et al. ...................... 371/60

Primary Examiner—Gareth D. Shaw
Assistant Examiner—Kevin A. Kriess
Attorney, Agent, or Firm—Kerkam, Stowell, Kondracki & Clarke

[57] ABSTRACT

Digital data storage apparatus includes a data store DS having a plurality of multiple-bit word locations, and validity store VS having a lesser plurality of multiple-bit word locations arranged such that each separate bit corresponds to a separate word location in the data store. A first auxiliary store AS1 has a number of bit locations at least equal to the number of word locations in the validity store with each bit identifying the status of the validity bits in a separate word of the validity store. A number of further auxiliary stores are also provided, arranged in increasing order of significance and each having a lesser plurality of bit locations each of which corresponds to a separate word location in the next less significant auxiliary store. Circuit means CM are provided and connected in such a way that areas of the data store may be declared valid or invalid by setting appropriate bits in each of the auxiliary stores. Any area of the data store may be declared invalid in not more than two cycles.

6 Claims, 10 Drawing Figures

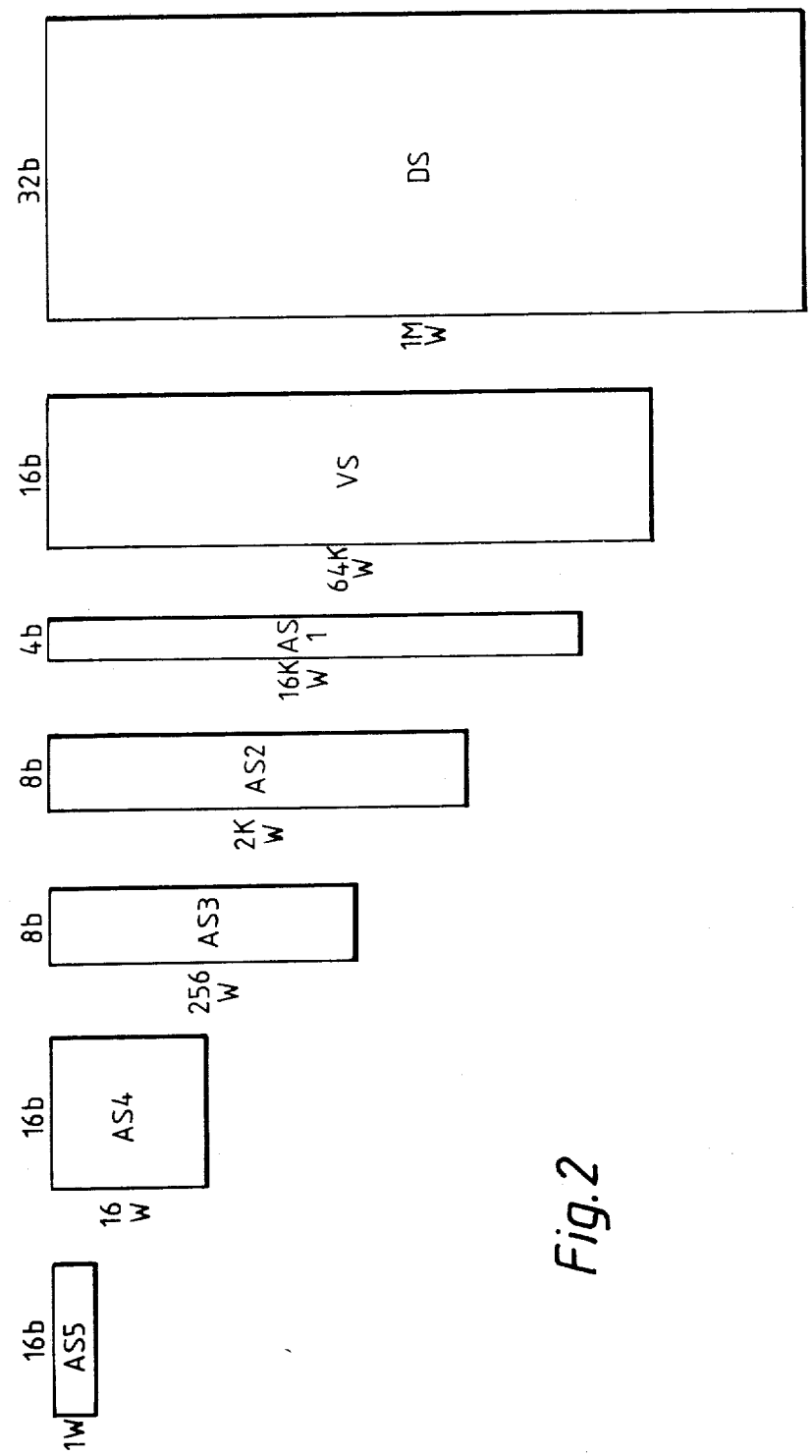

DIGITAL DATA STORAGE APPARATUS

BACKGROUND OF THE INVENTION

Digital data storage apparatus is commonly used for the storage of large quantities of data, usually in the form of multiple-bit words. Data may be written into the store at any location by addressing that location and applying the data to be stored there. Similarly the data at any location may be read out by addressing that location and activating the read function. Many types of store operate in this simple manner. It is common practice that, before a section of storage is to be used for some new purpose, it is cleared in order to remove any residual data left from an earlier operation, and thus reduce the possibility of a malfunction. Sometimes this clearing operation is carried out immediately after the completion of an operation using the section of storage, particularly when confidentially of data is important, in order to prevent accidental disclosure.

In order to identify whether the contents of the store have any meaning or not, it is not uncommon practice to add to each multiple-bit word an extra bit called a "validity" bit. This bit is arranged to be "set" when data is written into a store location, and is "cleared" before a section of store is brought into use. Hence one action when reading from a store location is to examine the validity bit. If the bit is "clear", then the output from the store at that location is invalid. This means that data in the store is meaningless, and may be forced to zero. What follows is that, instead of actually clearing every bit position in an area of store to be cleared, it is only necessary to clear the validity bits, since no output can then be obtained from that area. It is usually necessary to address every validity bit separately, since each has a different address, in order to clear a general area of store. If a large area of store is to be cleared this can take a relatively long time.

It is an object of the invention to provide digital data storage apparatus in which a consecutive set of validity bits may be set or cleared in a very short time.

SUMMARY OF THE INVENTION

According to the present invention there is provided digital data storage apparatus which includes a data store having a plurality of multiple-bit word locations, a validity store having a lesser plurality of multiple-bit word locations arranged such that each separate bit location corresponds to a separate word location in the data store and contains the validity bit for that word, a first auxiliary store having a number of bit locations at least equal to the number of word locations in the validity store and arranged such that each of said bits identifies the status of the validity bits in a separate word of the validity store, one or more further auxiliary stores arranged in increasing order of significance and each having a lesser plurality of bit locations each of which corresponds to a separate word location in the next less significant auxiliary store, and circuit means connected to the validity store and to the auxiliary stores such that areas of the data store may be declared valid or invalid by setting appropriate bits in each store so as to define the status of the validity bits corresponding to the area of the data store defined by the addresses of the limits of said area.

BRIEF DESCRIPTION OF THE DRAWINGS

The invention will now be described with reference to the accompanying drawings, in which:

FIG. 2 illustrates one possible arrangement of stores;

DESCRIPTION OF THE PREFERRED EMBODIMENTS

Figure 1:
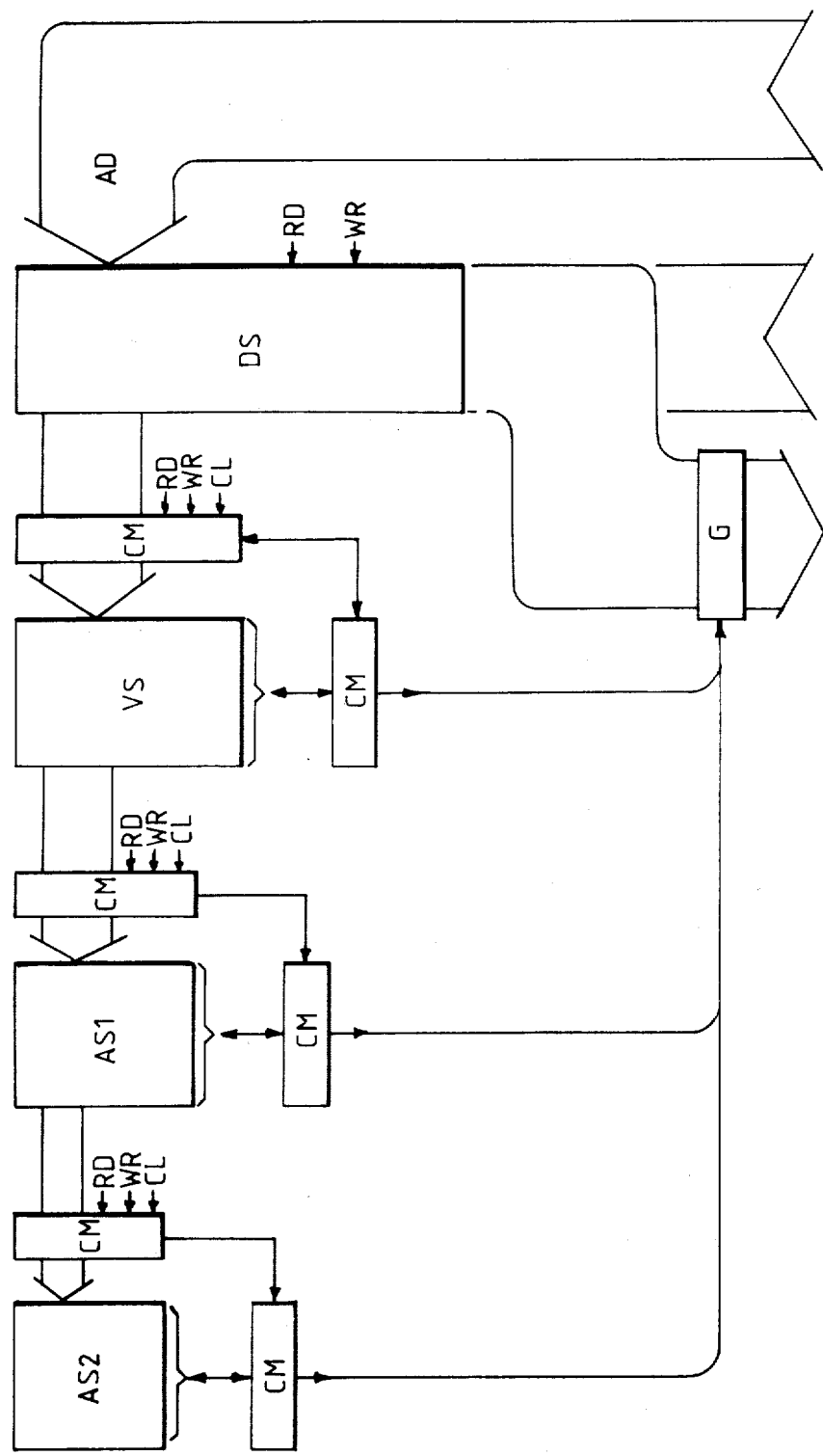
FIG. 1 is a schematic diagram of storage means according to the invention.

Referring now to FIG. 1, this shows the data store DS with address inputs AD and "read" (RD) and "write" (NR) control inputs. Data may be read from or written into the data store in the conventional way. The store may be, but need not be, built up from a number of one-bit semiconductor memory chips so as to make up the desired word length.

A second store, the validity store VS, is provided and has a smaller number of word locations than the data store DS. The number of bits in the validity store is such that a separate bit corresponds to each separate word location of the data store DS.

The most significant bits of an address applied to the data store DS are applied to circuit means CM associated with the validity store VS. The most significant bits of the address select a desired word location in the validity store, whilst the remaining bits of the address select the appropriate bit from that selected word. Also applied to the circuit means are "read" (RD), write (WR) and "clear" (CL) control inputs, the purpose of which will be described later. The control means also controls the input of data to, and the output of data from the validity store VS, and provides an input to a gate G which controls the output of data from the data store DS.

A first auxiliary store AS1 has a number of bit locations equal to the number of words in the validity store VS. The most significant bits of the word address applied to the validity store define a word address in the first auxiliary store AS1, whilst the remaining bits define the bit address. Hence the word address of the validity store defines one particular bit in the first auxiliary store, for both reading and writing operations. As before, the address is applied to circuit means CM which control the operation of the store. The output from the first auxiliary store provides a further control input to the gate G.

One or more further auxiliary stores may be provided, arranged in decreasing order of storage capacity, of which only one, designated AS2, is shown. Each store contains a number of bits of least equal to the number of words in the next longest auxiliary store, has its own controlling circuit means CM. The smallest auxiliary store will be represented as a single word.

FIG. 2 shows one possible arrangement of the data store DS, validity store VS and five auxiliary stores. In this example, the data store is a 1M-word store, with each word of 32 bits. Here we shall use the common practice of using "K" to denote $2^{10}(=1024)$ and "M" to denote $2^{20}(=K\times K=1,048,576)$. The validity store has been chosen to provide 64K words each of 16 bits, a size which is readily available commercially. Each bit is the validity bit for one word in the data store DS.

The first auxiliary store AS1 provides 16K words each of 4 bits. Each bit corresponds to one word in the validity store VS, and hence to 16 words in the data store DS. The second auxiliary store AS2 provides 2K words each of 8 bits. Hence each bit corresponds to one word in the first auxiliary store AS1, to four words in the validity store VS, or to 64 words in the data store DS. The third auxiliary store AS3 provides 256 words of 8 bits. Each of the used bits corresponds to 512 words in the data store DS. The arrangement may be continued with a fourth auxiliary store AS4, having 16 words each of 16 bits, so that each bit corresponds to one of the words in the third auxiliary store, or to 4K words in the data store. Finally, the fifth auxiliary store AS5 has one word of sixteen bits. Each bit therefore corresponds to 64K words in the data store DS.

The arrangement described above is one of many which may be used. Stores used are of commercially available capacity, and word length and number of words may be selected by the designer to suit any preferred arrangement.

Since the outputs of each auxiliary store and the validity store control the output from the data store DS, it will be seen that large areas of the data store may be controlled by a single bit in one or more of the auxiliary stores. In the extreme case, setting one bit in the fifth auxiliary store AS5 will block the outputs from 64K words of the data store DS, thus declaring that area of store to be "clear" or "invalid".

The operation of the apparatus so far described will now be explained with reference to FIG. 3. This shows a much simplified arrangement, in which the data store DS has only thirty-two word locations. The validity store VS is an eight word store, with each word four bits in length. Hence one bit of the validity store contains the validity bit of a unique word in the data store DS. The validity store is shown in "exploded" form to indicate the correlation of each word with an area of the data store.

The first auxiliary store AS1 contains only two four-bit words, and again the correlation between these words and an area of the validity store is shown. Finally, the second auxiliary store AS2 has a single two-bit word, with one bit corresponding to a separate word of the first auxiliary store.

Each word of the data store DS is identified by a unique five-bit address. The three most significant bits of this address define the word in the validity store relating to the relevant section of the data store, whilst the two other bits of the address define the bit in that word of the validity store. The addresses of the bits of the validity store are indicated in FIG. 3. In a similar manner, the most significant bit of the word address for the first auxiliary store defines the word in the second auxiliary store which relates to the particular area of the first auxiliary store, while the two least significant bits define the bit position within that word. Finally, the one-bit word address of the first auxiliary store defines the bit in the second auxiliary store which relates to that word in the first auxiliary store.

Figure 3A:
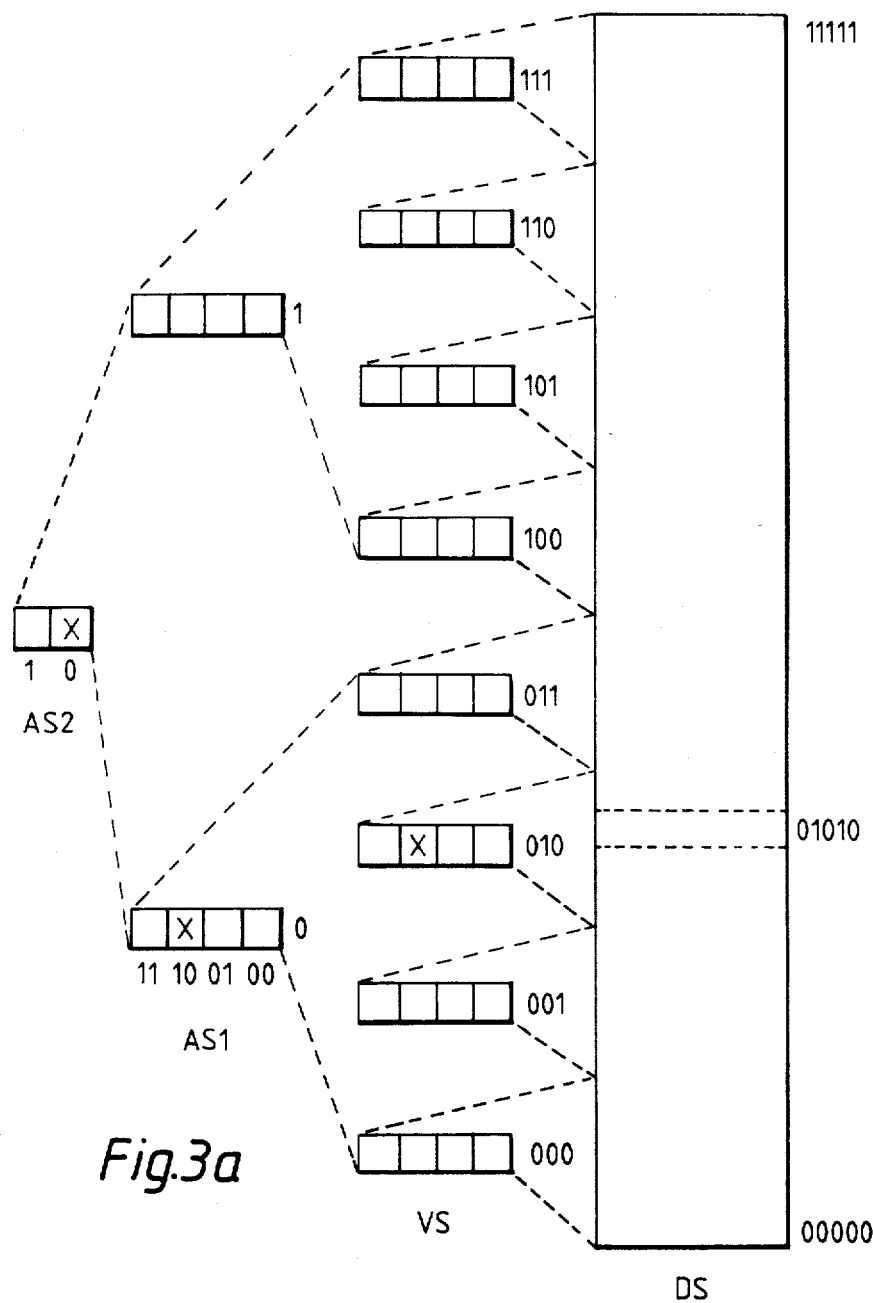
FIGS. 3(a) to 3(e) are diagrams of a simplified store arrangement, illustrating different modes of operation.

When reading a word from the data-store DS, the address which defines the word to be read out also identifies a single bit in the validity store VS and in each of the auxiliary stores AS1 and AS2. As shown in FIG. 3(a) the address 01010 for the data store defines the bits indicated in each of the other stores. If, as shown, each of the bits in the validity store VS and the two auxiliary stores AS1 and AS2 are "set", then the data read out from the data store is considered to be valid. If, on the other hand, one or more of the selected bits in the validity and auxiliary stores is "clear", then the output of the data stores is blocked or declared "invalid".

It will be seen that it is no longer necessary to actually "clear" locations in the data store, but simply to clear a number of bits in the validity and auxiliary stores. The contents of the data store at the location so defined are immaterial, since they cannot be read out to other circuitry.

The "clear" operation is the one to which the invention is particularly applicable. As already stated, it is not necessary to clear the word location or locations in the data store, as the same effect is produced by "clearing" the appropriate bits if any, in the auxiliary stores.

Figure 3B:
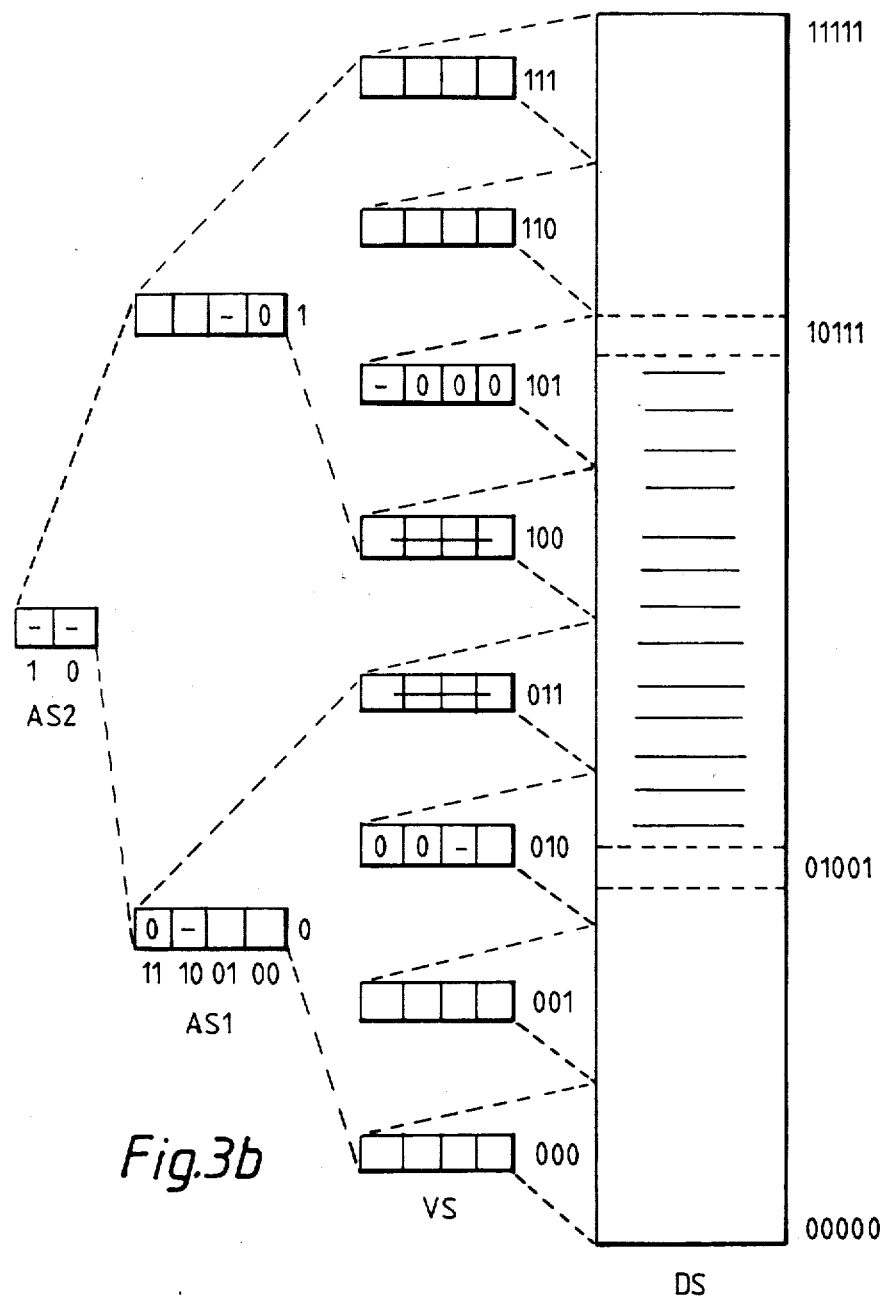

The most important operation is to clear a large are of the data store. This is clearly a simple operation if the area corresponds to a single bit in the auxiliary store described, but in the general case the area may neither start nor finish on a simple boundary. Conventional stores do this by setting each validity bit to "clear" one at a time, and this may be a fairly lengthy operation. FIG. 3(b) illustrates how this operation is greatly simplified by the apparatus already described. It is assumed that the data store DS is to be cleared between the addresses 01001 and 10111, but not including those two addresses. It will be seen from FIG. 3(b) that the two addresses are defined by the bits marked with a dash in the validity store VS and the auxiliary stores AS1 and AS2. The circuit means of the invention operates to clear all bits in the validity store word above the lower address and below the higher address, and these bits are indicated by '0' in the drawing. The same procedure is followed in the first auxiliary store AS1, again as shown. Neither bit in the second auxiliary store AS2 is set to "clear" since there may be valid data in areas of the data store outside that cleared.

It will be seen that the effect of this is to define as "clear" all words of the data store DS between the two limits. If the data store is considered to be in eight sections, each represented by a word of the validity store, then the words set "clear" in the section denoted by the three most significant bits of the lower address, that is 010, are identified by the two bits in the word of the validity store having that word address. Similarly, the words set "clear" in the section denoted by the three most significant bits of the higher address, that is 101, are identified by the three bits in the word of the validity store having that word address. The two sections of the data store between these, identified by the validity store word addresses 001 and 100 are defined by the two bits set to "clear" in the first auxiliary store AS1. Thus the designated area of the data store may be set to clear in only two operations, one corresponding to each of the limits of the area.

Figure 3C:
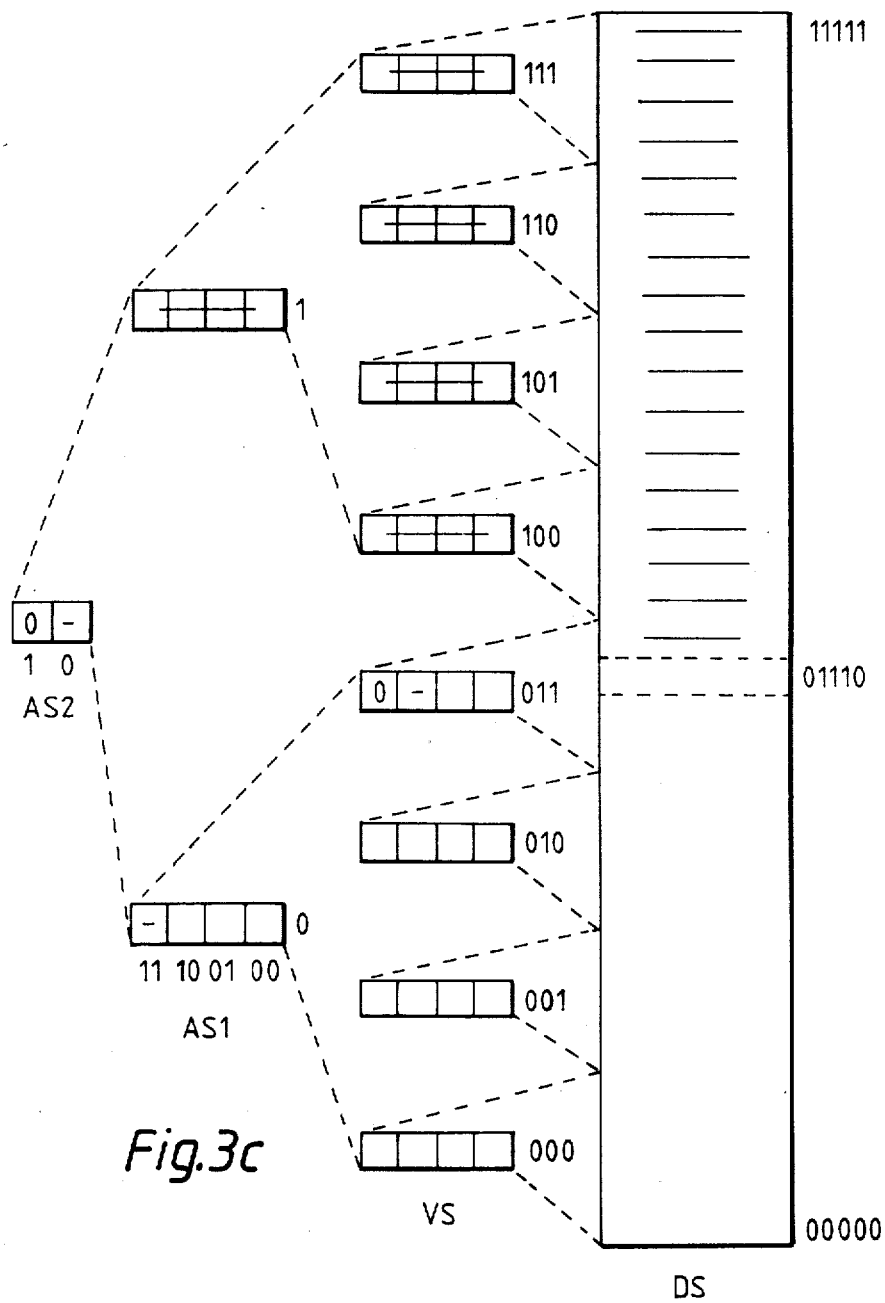

If the area of the data store to be cleared includes one entire half of the data store, then one of the two bits in the second auxiliary store AS2 may be set to "clear". This is illustrated in FIG. 3(c), and shows how that bit in the second auxiliary store is sufficient to define one half of the data store as clear without the need to "clear" any of the relevant validity bits. The first validity store AS1 has no bits set to "clear" in the example shown, since only one word in the other half of the data store is set to "clear", and this has to be identified by its particular validity bit as shown.

Figure 3D:
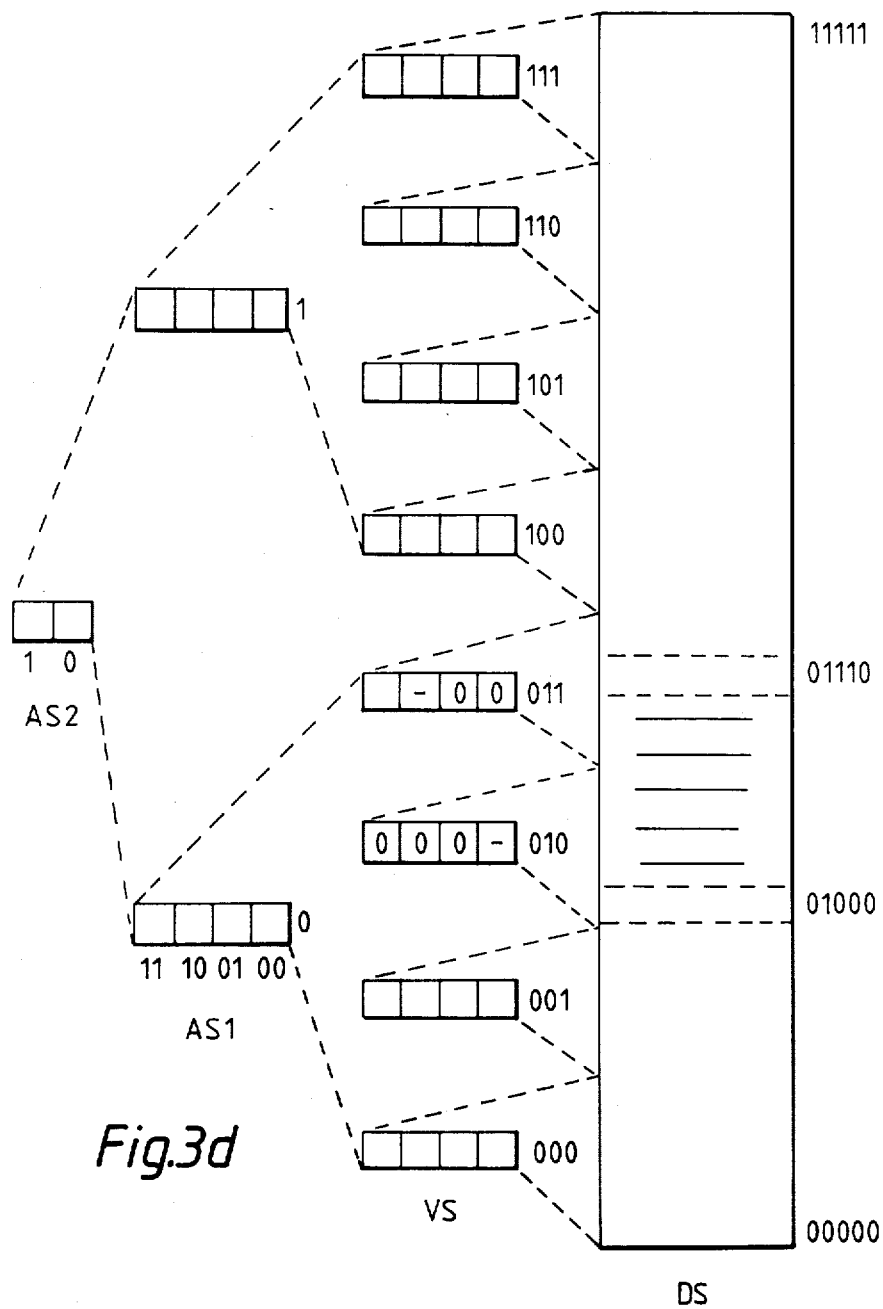

If the area of the data store to be cleared is all defined by one word of the validity store VS, or by two adjacent words, then only bits in this store will be set to "clear", and the two auxiliary stores AS1 and AS2 will not be changed. This is illustrated in FIG. 3(d).

At this point it is worth repeating that all the affected bits are defined by only two addresses, namely those which specify the upper and lower bounds of the cleared area. Thus the time taken to perform the general "clear" operation is only that required to carry out two "write" operations in the validity and auxiliary stores. The main data store itself is not changed.

A "write" operation also operates upon the validity and auxiliary stores. It is first necessary to read the state of the auxiliary stores, in this case by reading the appropriate bits from the two auxiliary stores AS1 and AS2. At the same time the data may be written into the data store, and the corresponding validity bit may be set "valid". However, the state of the adjacent bits in the word of the validity store, and of the bits in the auxiliary stores defining that area of data store containing the address may also need to be changed.

Figure 3E:
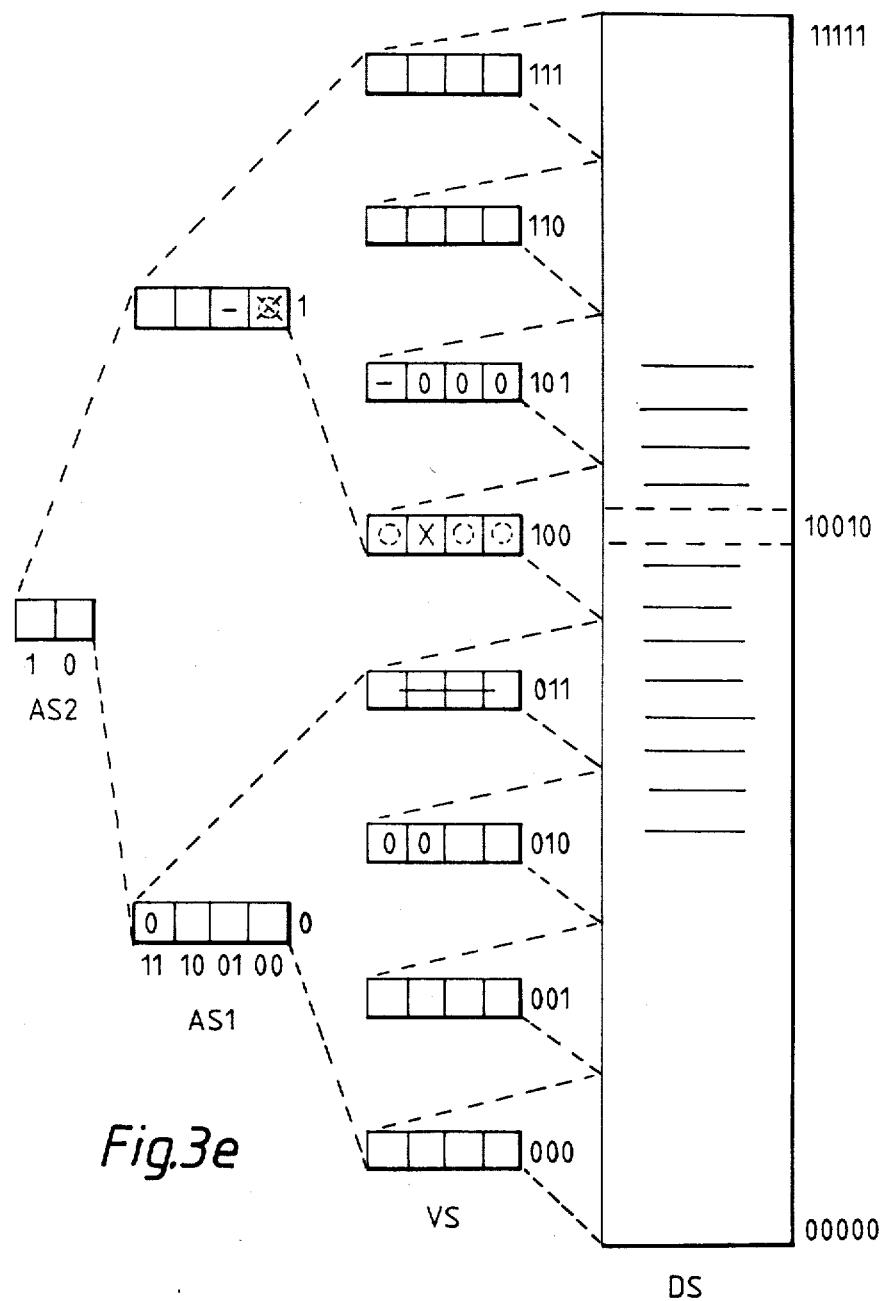

Consider the situation shown in FIG. 3(e), where it is assumed that the area of the data store indicated by horizontal lines drawn through words has already been cleared in the manner described above with reference to FIG. 3(b). This area is denoted by the bits shown as "0" in the drawing, which define the area completely. If new data is to be written into the data store DS at the address 10010, it will be seen that this is within the cleared area. The validity bit for this is shown a "X" in the validity store word denoted by the three most significant bits of the data store address, namely 100. This word of the validity store was not set in the earlier "clear" operation, since it was defined by a single bit in the first auxiliary store AS1. Hence it is now not necessary to "set" the appropriate bit in the validity store word, but it is necessary to change the "clear" bit in the first auxiliary store AS1, to indicate that the appropriate validity word contains a bit which has been "set". This is also denoted in FIG. 3(e) by a broken character. Having set this it is now also necessary to "clear" the remaining bits of the validity store word, as shown in broken characters. This ensures that the adjacent words in the data store defined by the other three bits in the validity store word are still "clear". Once again, the only bits affected are those in the words selected by the single address.

To summarise then, in a store whose internal organisation is as described:
(a) the WRITE operation appears externally to be conventional. The data is stored in the selected location and the validity bit (and corresponding auxiliary bits) are set 'valid'. Internally, if any of the auxiliary bits were detected to be 'clear' by the perliminary read operation, then the remaining bits of the selected words in the less significant auxiliary stores and the validity store are 'cleared', in order to maintain the invalidity of the adjacent words in store.
(b) the READ operation also appears to be conventional. Invalid data is always presented as zero, and a validity bit is available for external use if desired. The auxiliary structure is not visible.
(c) a new function, CLEAR, is made available. This requires two addresses to be presented, which set the upper and lower bounds of the area to be cleared (or "invalidated"). This operation will clear any desired area of the store, from one word to the whole store, in a maximum time determined by two successive write cycles in the auxiliary and validity stores.

The basic logic necessary to perform the operations described above is shown in FIGS. 4(a), 4(b) and 4(c). These illustrate one way of controlling an auxiliary store, and use auxiliary store A52 of FIG. 2 by way of example. The three operations are shown separately, but will be seen that much of the logic is common to all operations.

Figure 4A:
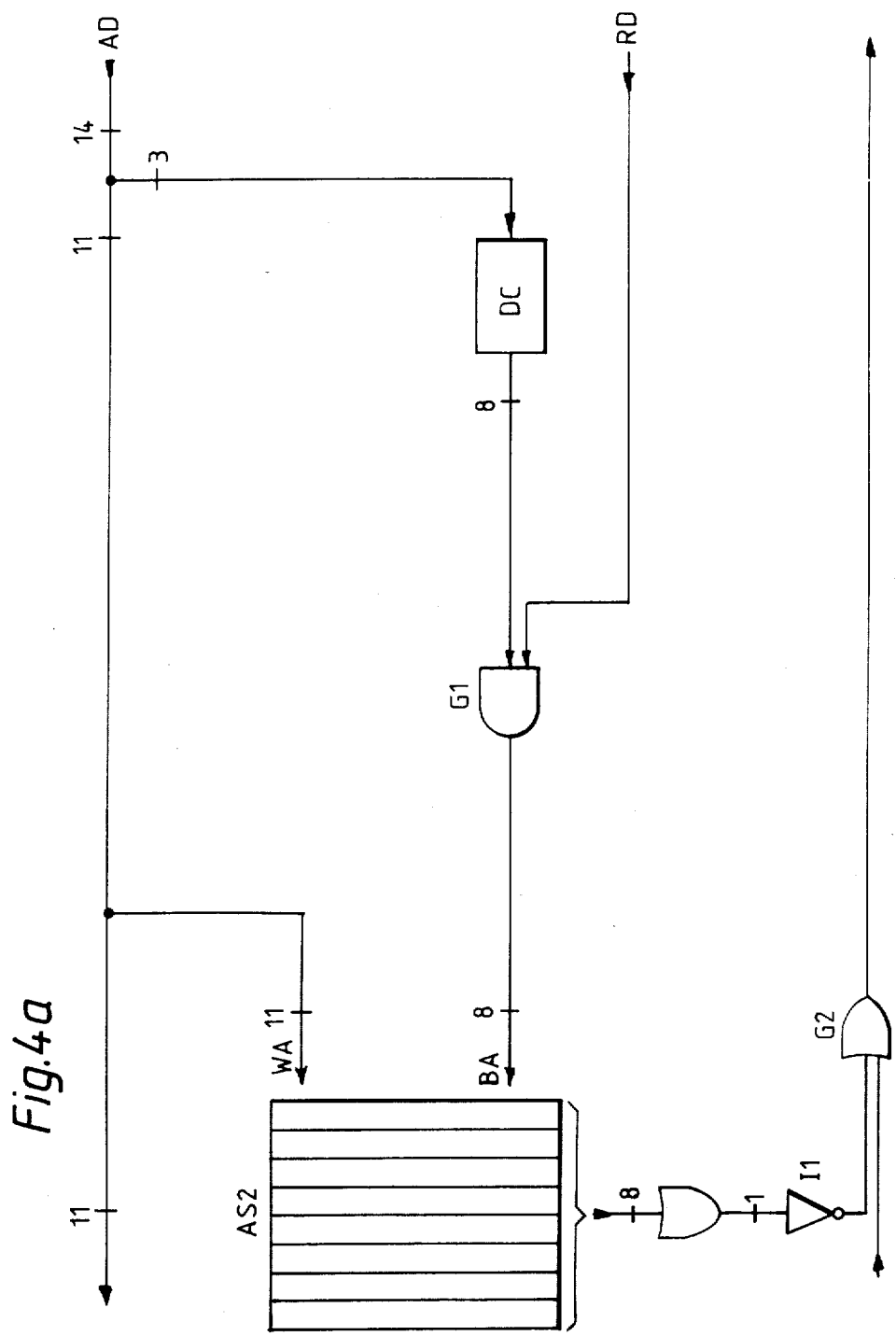
FIGS. 4(a), 4(b) and 4(c) are schematic block diagrams illustrating the operation of the data storage apparatus.

Referring now to FIG. 4(a), this shows the logic necessary to perform the "read" operation. The store has its 16K bits arranged as 8 "slices" each of 2K bits. Accordingly, the 14 bit address is split up into the 11 most significant bits, which are used as the "word" address, WA, and the 3 least significant bits, which form the "slice" address, that is the address of any bit in the word. The "slice" address is decoded by a "one-out-of-8" decoder DC to identify the particular slice containing the required bit, and this is gated by AND gate G1 with the "read" command signal to give a bit address BA. An output is obtained if the bit read out represents "valid", and hence this is inverted by inverter I1, so that the absence of an output presents the "invalid" condition. This is combined with "invalid" output signals from any more significant auxiliary stores by OR gate G2 to provide the output validity bit.

Figure 4B:
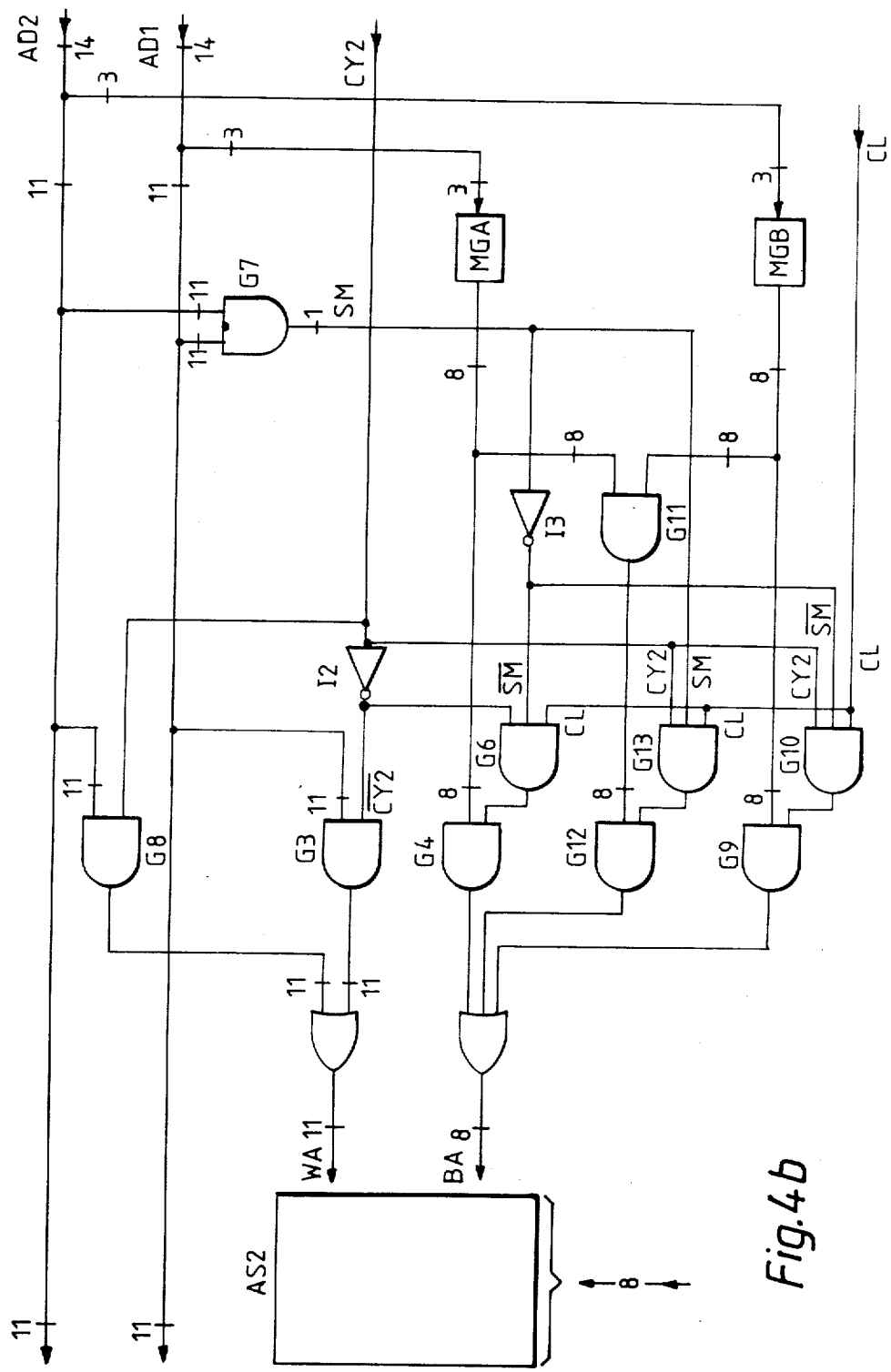

As will be seen from FIG. 4(b) the logic required to perform the "clear" operation is more complex. This is because several different conditions may exist, as described earlier. Referring to FIG. 4(b), two addresses are applied, the first address AD1 defining the lower limit of the area to be cleared whilst the second address AD2 defines the upper limit. Since two operations are usually required to clear an area of store, an input CY2 denotes the second cycle of the operation. As with the read operation, the fourteen bits of an address are split into the eleven most significant bits, defining the word address, WA and the three least significant address, defining the "slice" address. Assuming initially that the two addresses define different words, the logic operates as follows.

During the first cycle an inverter I2 products a $\overline{CY2}$ signal which enables AND gate G3 to pass the 11-bit word address WA to the store AS2. The three least significant bits of the address are applied to a mask generator MGA which generates a "some-out-of-eight" code to identify all bit addresses which are more significant than the bit address identified by the three-bit address. These pass to AND gate G4 which is enabled by the output of a control AND gate G6. The inputs to the gate G6 are the "clear" signal CL, the CY2 signal from invertor I2, and a $\overline{SM}$ signal indicating that the word addresses are not identical. This latter signal is obtained by comparing the word addresses in AND gate G7 and inverting the output at invertor I3. The effect will therefore be to write "clear" into all bits of the selected word which are more significant than the bit defined by the first address.

During the second cycle, the eleven bits of the second word address are gated with the CY signal in AND gate G8, and define the selected word in the store AS2. The three least significant bits are applied to a second mask generator MGB, which generates all bit addresses less significant than that identified by the three-bit address. These pass to AND gate G9, which is enabled by the output of a control AND gate 10. Gate 10 has as its inputs the "clear" signal CL, the CY2 signal denoting the second cycle, and the $\overline{SM}$ signal as before. The effect will therefore be to write "clear" into all bits of the selected word which are less significant than the bit defined by the second address.

If the first and second address define the same word, then the SM signal from gate G7 inhibits the operation of gates G6 and G10. The two mask patterns from mask generators MGA and MGB are gated in AND gate G11, and the output identifies only the bits between those defined by the two addresses. These are passed to AND gate G12, which is enabled by AND gate G13. Gate G13 has as its inputs the "clear" signal CL, the SM signal from gate G7, and the CY2 signal, allowing this operation to occur only during the second cycle. Hence the bits of the selected word between the two addresses are set to "clear".

Figure 4C:
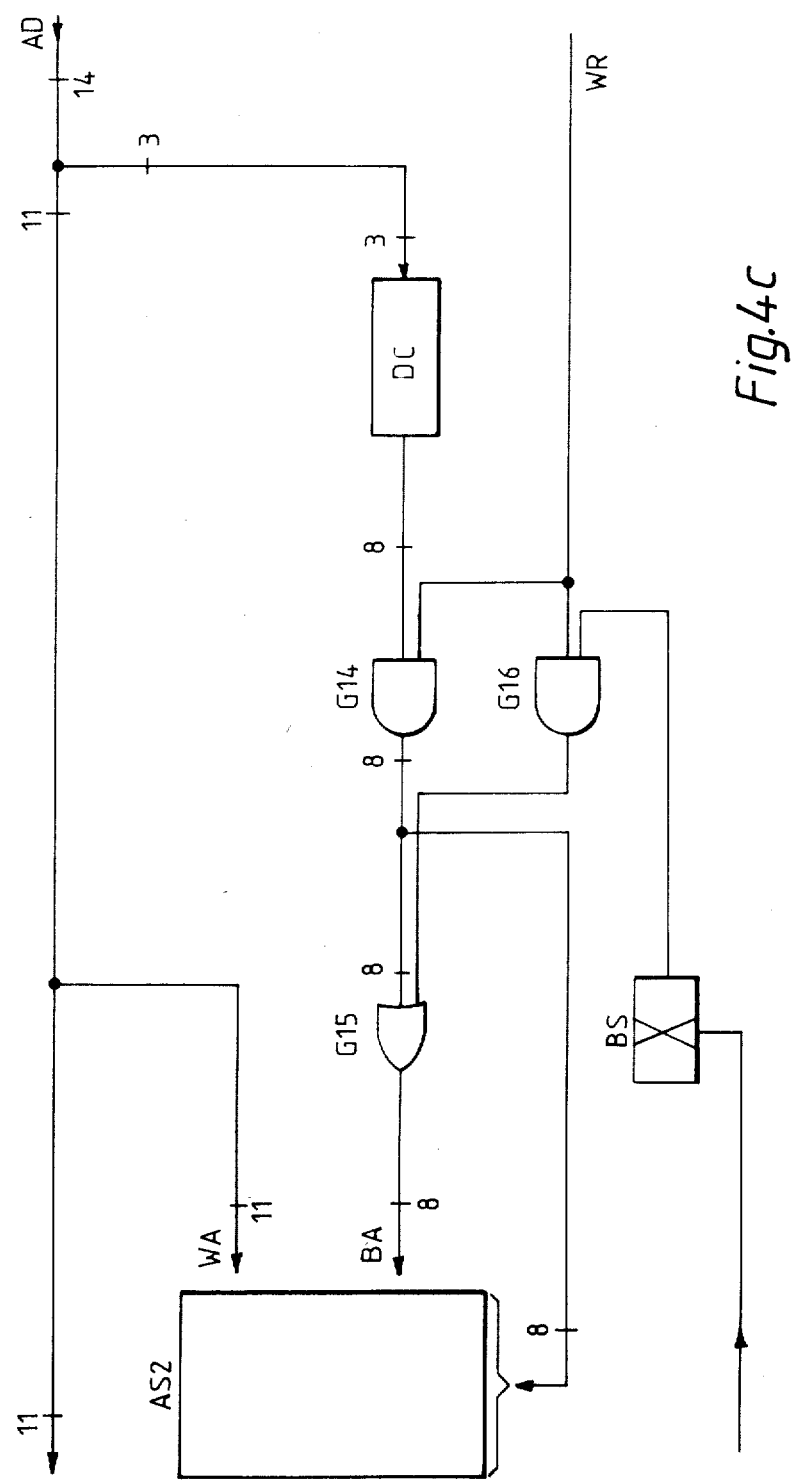

FIG. 4(c) illustrates simple logic necessary to perform the "write" operation. As already described, this is preceded by the "read" operation, which may produce an invalidity bit from the more significant auxiliary stores. The word addressing and bit decoding is as described for the "read" operation.

The output of the decoder DC is applied to an AND gate GH, along with the "write" command signal, and the output of these gates forms one input to an OR gate G15 and also forms the data to be written into the store. A bistable circuit BS has been set by the presence of an invalidity bit from a more significant auxiliary store, and the output of the bistable circuit forms one input of a further AND gate G16. The other input of this gate is the "write" command signal, and the output of gate G16 forms an enabling input to gate G15.

If no invalidity bit was present, then the bit address BA from the decoder is passed through gates G14 and G15 and causes the appropriate bit in the store to be set to "valid". If, however, an invalidity bit was present, then the output from the bistable circuit BS causes the output of gate G16 to enable gate G15 to identify all bits in the addressed word. Only the bit selected by the decoder DC is set to "valid", and all other bits in the addressed word are set to "invalid". This satisfies the requirements set out earlier for writing a bit into a previously cleared word.

The logic diagrams of FIG. 4 have been simplified by showing single signal paths. The diagrams indicate the number of parallel bits on any path, and the gates will accordingly be multiple gates. The OR gates used to control store addressing are shown but have not been described. It should be remembered that all auxiliary stores and the validity store are addressed together.

It will be appreciated that other logic arrangements may be provided for performing the necessary operations described above. Similar arrangements are provided for each of the auxiliary stores.

Reference has been made above to the provision of a validity store to provide a validity bit for each word of data in the data store. It will be appreciated that more than one bit could be provided for each word, and that these bits could be used for other purposes than defining the validity of the data.

I claim:

1. Digital data storage apparatus comprising:
    a data store having a plurality of word locations for storing multiple-bit words;
    said data store having a multiple bit address input and a data output;
    a gate for controlling the data output, said gate having a plurality of logical OR control inputs such that any gate control input can block data output;
    a validity store having a lesser plurality of word locations than said data store for storing multiple-bit words, each individual bit in said validity store corresponding to one word location in said data store and capable of being set to a particular state to indicate the corresponding word in said data store is invalid, and each word in said validity store corresponding to a sequence of several words in said data store based on the individual bits of said validity store word;
    a plurality of auxiliary stores organized in an increasing order of significance defined as commencing with a first auxiliary store which is of lowest significance and of largest storage capacity, and ending with a smallest auxiliary store which is of highest significance;
    said first auxiliary store having a number of bit locations at least equal to the number of word locations in said validity store, said first auxiliary store bit locations being organized as a plurality of first auxiliary store word locations for storing multiple-bit words, each of said number of first auxiliary store bit locations corresponding to a respective separate word in said validity store and capable of being set to a particular state to indicate invalidity of a sequence of words in said data store in turn corresponding to the corresponding separate word in said validity store, and each word in said first auxiliary store thus corresponding to a sequence of words in said data store based on the individual bits of each of the validity store words respectively corresponding to the bits of said first auxiliary store word;
    each successively more significant auxiliary store having a lesser number of bit locations, the bit locations of each of the auxiliary stores of lesser significance than the smallest auxiliary store being organized as a plurality of word locations for storing multiple-bit words, and each auxiliary store bit location corresponding to a separate word in the next less significant auxiliary store and capable of being set to a particular state to indicate invalidity of a sequence of words in said data store corresponding to the corresponding word in each successively less significant auxiliary store of said plurality of auxiliary stores;
    said validity store and each of said auxiliary stores having a respective address input connected to a number of the most significant address bits input to said data store sufficient to address a single bit in said validity store and each of said auxiliary stores; and
    said validity store and each of said auxiliary stores having a validity data output applied as a control input to said gate such that if any bit addressed in said validity store or in said auxiliary stores indicates invalid data then data output from said data store is blocked;
    whereby areas of said data store between selected limits can be declared invalid by setting bits in selected ones of said validity store and said auxiliary stores to the particular state.

2. Storage apparatus as claimed in claim 1 in which the auxiliary store of highest significance has a single multiple-bit word location.

3. Storage apparatus in accordance with claim 1, wherein:
first and second addresses define lower and upper limits respectively of an area of said data store; and which further includes:
circuitry operable to identify in an auxiliary store bits forming part words only and corresponding to words in said data store immediately adjacent the upper and lower limits; and
circuitry operable to identify in the next more significant auxiliary store bits representing complete words corresponding to words in said data store within the upper and lower limits.

4. Storage apparatus as claimed in claim 3, wherein said circuitry includes:
first pattern generating means responsive to the first address to identify those bits in part only of a word in an auxiliary store which correspond to locations in said data store higher than the lower limit; and
second pattern generating means responsive to the second address to identify those bits in part only of a word in an auxiliary store which correspond to locations in said data store lower than the higher limit.

5. Storage apparatus as claimed in claim 4, wherein said circuitry includes means for determining when the first and second addresses identify the same word in an auxiliary store.

6. Storage apparatus as claimed in claim 1, wherein said validity store has more than one validity bit corresponding to each word location in said data store.

* * * * *